United States Patent
Rattray et al.

(10) Patent No.: US 9,765,240 B2
(45) Date of Patent: Sep. 19, 2017

(54) PRESSURE-SENSITIVE ADHESIVE LAYERS WITH SURFACE-ENRICHED STRIPES AND METHODS OF MAKING

(71) Applicant: 3M INNOVATIVE PROPERTIES COMPANY, St. Paul, MN (US)

(72) Inventors: Tyler J. Rattray, Minneapolis, MN (US); Carlos A. Barrios, Woodbury, MN (US); James L. Bries, Cottage Grove, MN (US); Gary W. Maier, Roberts, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/901,341

(22) PCT Filed: Jun. 23, 2014

(86) PCT No.: PCT/US2014/043690
§ 371 (c)(1),
(2) Date: Dec. 28, 2015

(87) PCT Pub. No.: WO2014/209895
PCT Pub. Date: Dec. 31, 2014

(65) Prior Publication Data
US 2016/0152869 A1 Jun. 2, 2016

Related U.S. Application Data (60) Provisional application No. 61/838,533, filed on Jun. 24, 2013.

(51) Int. Cl.
*C09J 7/02* (2006.01)
*B05D 1/26* (2006.01)
(Continued)

(52) U.S. Cl.
CPC .......... *C09J 7/0207* (2013.01); *B05D 1/265* (2013.01); *C09J 7/0214* (2013.01); *C09J 7/0217* (2013.01);
(Continued)

(58) Field of Classification Search
None
See application file for complete search history.

(56) References Cited

U.S. PATENT DOCUMENTS

| 4,386,998 A | 6/1983 | McIntyre |
| 5,082,706 A | 1/1992 | Tangney |

(Continued)

FOREIGN PATENT DOCUMENTS

| WO | WO 2011/090603 A1 | 7/2011 |
| WO | WO 2014-209622 | 12/2014 |
| WO | WO 2014-209637 | 12/2014 |

OTHER PUBLICATIONS

International Search Report for PCT International Application No. PCT/US2014/043690, mailed on Oct. 15, 2014, 3 pages.

(Continued)

*Primary Examiner* — Laura Powers
(74) *Attorney, Agent, or Firm* — Kenneth B. Wood (57) ABSTRACT

Herein are disclosed a pressure-sensitive adhesive layer on a substrate, the adhesive layer containing stripes of first and second pressure-sensitive adhesives. The surface of the adhesive layer that faces the substrate is surface-enriched with the first pressure-sensitive adhesive. Methods of making are disclosed.

16 Claims, 1 Drawing Sheet (51) Int. Cl.
    *C09J 183/04*     (2006.01)
    *C09J 133/00*     (2006.01)
    *C09J 107/00*     (2006.01)
    *C09J 153/00*     (2006.01)

(52) U.S. Cl.
    CPC ........... *C09J 7/0221* (2013.01); *C09J 107/00* (2013.01); *C09J 133/00* (2013.01); *C09J 153/00* (2013.01); *C09J 183/04* (2013.01); *C09J 2201/40* (2013.01); *C09J 2201/606* (2013.01); *C09J 2205/114* (2013.01); *C09J 2407/00* (2013.01); *C09J 2433/00* (2013.01); *C09J 2453/00* (2013.01); *C09J 2483/00* (2013.01)

(56) References Cited

U.S. PATENT DOCUMENTS

| | | |
|---|---|---|
| 5,094,788 A | 3/1992 | Schrenk |
| 5,110,530 A | 5/1992 | Havens |
| 5,110,890 A | 5/1992 | Butler |
| 5,120,484 A | 6/1992 | Cloeren |
| 5,214,119 A | 5/1993 | Leir |
| 5,461,134 A | 10/1995 | Leir |
| 5,512,650 A | 4/1996 | Leir |
| 5,578,381 A | 11/1996 | Hamada |
| 5,677,376 A | 10/1997 | Groves |
| 5,851,566 A | 12/1998 | Potjer |
| 6,231,962 B1 | 5/2001 | Bries |
| 6,352,758 B1 | 3/2002 | Huang |
| 6,407,195 B2 | 6/2002 | Sherman |
| 6,441,118 B2 | 8/2002 | Sherman |
| 6,569,521 B1 | 5/2003 | Sheridan |
| 6,669,887 B2 | 12/2003 | Hilston |
| 6,803,076 B2 | 10/2004 | Loukusa |
| 6,846,893 B1 | 1/2005 | Sherman |
| 7,153,924 B2 | 12/2006 | Kuepfer |
| 7,371,464 B2 | 5/2008 | Sherman |
| 8,344,037 B2 | 1/2013 | Yamada |
| 2002/0108564 A1 | 8/2002 | Gruenewald |
| 2008/0233848 A1 | 9/2008 | Nordstrom |
| 2009/0162595 A1 | 6/2009 | Ko |
| 2009/0229732 A1 | 9/2009 | Determan |
| 2009/0291279 A1* | 11/2009 | Schroeer ............... C09J 7/0207 428/214 |
| 2011/0071270 A1 | 3/2011 | Hays |
| 2011/0126968 A1 | 6/2011 | Determan |
| 2011/0171430 A1 | 7/2011 | Mayers |
| 2012/0148791 A1 | 6/2012 | Yamanaka |
| 2012/0271025 A1 | 10/2012 | Hays |
| 2013/0060209 A1 | 3/2013 | Tyler |
| 2013/0075027 A1 | 3/2013 | Sheridan |

OTHER PUBLICATIONS

Extended European Search Report, EP14817040.0, dated Feb. 2, 2017, 3 pages.

\* cited by examiner

PRESSURE-SENSITIVE ADHESIVE LAYERS WITH SURFACE-ENRICHED STRIPES AND METHODS OF MAKING

BACKGROUND

Pressure-sensitive adhesives (PSAs) are widely used for various bonding applications.

SUMMARY

In broad summary, herein is disclosed an article comprising a pressure-sensitive adhesive layer on a substrate, the adhesive layer comprising stripes of first and second pressure-sensitive adhesives. The surface of the adhesive layer that faces the substrate is surface-enriched with the first pressure-sensitive adhesive. Methods of making such articles are also disclosed. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "top", bottom", "upper", "lower", "under", "over", "front", "back", "up" and "down", and "first" and "second" may be used in this disclosure, it should be understood that those terms are used in their relative sense only unless otherwise noted. The terms inward, outward, and lateral have particular meanings as defined later herein. The term "adhesive" as used herein means a pressure-sensitive adhesive. As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

DETAILED DESCRIPTION

Figure 1:
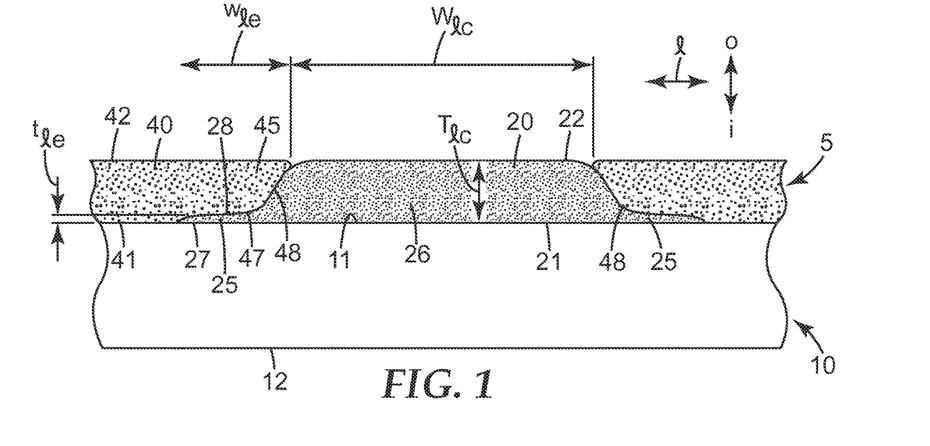
FIG. 1 is a schematic cross sectional slice view of a portion of an exemplary article as disclosed herein.

Shown in FIG. 1 is a schematic cross sectional slice view of a portion of an exemplary article (viewed along the long axis of stripes 20 and 40) as disclosed herein. The article comprises a substrate 10 with a first major surface 11 and a second major surface 12 that faces oppositely from first major surface 11. A primary adhesive layer 5 is disposed on first major surface 11 of substrate 10. Adhesive layer 5 comprises a plurality of stripes of a first pressure-sensitive adhesive 20 and of a second pressure-sensitive adhesive 40, arranged in a generally alternating pattern across a lateral extent "l" of substrate 10, as shown in exemplary manner in FIG. 1. (By a lateral direction, and the resulting lateral extent, is meant a direction that is substantially perpendicular to the long axes of the stripes). First pressure-sensitive adhesive 20 and second pressure-sensitive adhesive 40 may be any two (or more) pressure-sensitive adhesives that differ in properties (e.g., by virtue of differing in composition), as discussed in detail later herein. Substrate 10 may be any desired substrate, e.g. a release liner, as discussed in detail herein.

As stated above, stripes of pressure-sensitive adhesives 20 and 40 are arranged in a generally alternating pattern. An exemplary version of this is as shown e.g. in FIGS. 1-3, in which the following pattern is illustrated: [40/20/40/20 . . . ]. However, the concept of generally alternating also includes patterns in which any selected stripe (whether of adhesive 20 or 40) can be provided in the form of two or more sub-stripes. For example, one of e.g. stripes 20 or 40 or could be provided as two sub-stripes e.g. with a gap in between, instead of as a single stripe as shown in FIG. 1. Thus, for example, a generally alternating pattern includes such patterns as [20/(40/40)/20/(40/40) . . . ]; that is, a pattern in which two 40 sub-stripes are followed by a single 20 stripe); and, [(20/20)/(40/40/40) . . . ]; that is, a pattern in which two 20 sub-stripes are followed by three 40 sub-stripes), and so on. In many embodiments, stripes of pressure-sensitive adhesives 20 and 40 will be elongated so as to comprise long axes, although such long axes do not necessarily have to be strictly linear.

Individual stripes of adhesives 20 and 40 of adhesive layer 5 may have any desired average lateral width. In various embodiments, an individual stripe may comprise an average width that is at least about 0.1, 0.2, or 0.4 mm (noting that the width of a stripe may occasionally vary somewhat along the long axis of the stripe). In further embodiments, an individual stripe may comprise an average lateral width that is at most about 2, 1, or about 0.6 mm. Stripes of a particular type (e.g., of adhesive 20 or 40) do not all have to be of the same width; moreover, stripes 20 do not have to be the same width as stripes 40. As discussed extensively herein, the width of at least some stripes 20 (and 40) will be different on the side of the stripe that faces substrate 10, from the width on the opposite side. For such stripes, the average widths refer to the average of the widths on the two sides of the stripe.

Individual stripes 20 and 40 may have any suitable average thickness (in the inward-outward direction relative to substrate 10, as designated in FIG. 1). In various embodiments, stripes 20 and/or 40 may comprise an average thickness of at least about 10, 20, 40, or 60 microns. In further embodiments, stripes 20 and/or 40 may comprise an average thickness of at most 140, 100, 80, or 70 microns. In some embodiments, all stripes of a particular type may be similar in thickness and/or stripes 40 may have approximately the same average thickness as that of stripes 20.

However, it may not be required that all stripes have identical thickness or even similar thickness, as will be evident from later discussions herein. As discussed herein, the thickness of at least some stripes 20 (and 40) will vary across the lateral width of the stripe. For such stripes, the average thickness can be measured at or near the lateral center of the stripe (e.g., thickness $T_{lc}$ as shown in FIG. 1). In some embodiments, liner-facing major surfaces 21 of stripes 20 may be coplanar with liner-facing major surfaces 41 of stripes 40.

Stripes 20 and 40 may be provided at any desired pitch (i.e., the center-to-center distance between adjacent stripes). It may be advantageous that the pitch be relatively small e.g. so that a relatively smooth and continuous removal process (e.g., when peeling a conventional tape, or when stretching a stretch-releasable tape) may be obtained. Thus, in various embodiments, the center-to-center pitch between adjacent stripes may be at most about 4, 2.5, 2, 1.5, or 1 mm. In further embodiments, such a center-to-center pitch may be at least about 0.5, 1, 1.5, or 2 mm. The pitch does not have to be constant, but can be if desired. Individual stripes 20 and/or 40 may often be continuous along their long axis, but can be discontinuous (interrupted) if desired. However, in any case, such stripes will be distinguished (i.e., by way of each stripe being comprised of segments that each comprise a long axis that is coincident with the long axis of the stripe) from e.g. adhesives that are deposited on a surface as an array of dots by way of e.g. gravure coating, screen printing, and the like.

Surface Enrichment

At least selected pairs of adjacent stripes of first adhesive 20 and second adhesive 40 will be configured (as shown in exemplary embodiment in FIG. 1) so that a lateral edge portion 25 of first pressure-sensitive adhesive stripe 20 inwardly underlies a lateral edge portion 45 of second pressure-sensitive adhesive stripe 40. (Many stripes of this general type will comprise two such lateral edge portions 25, as shown e.g. in FIG. 1). As can be appreciated from the exemplary illustration of FIG. 1, by inwardly underlies means that a straight line that is passed in an outward→inward direction through portion 45 of second adhesive stripe 40 will pass through portion 25 of first adhesive stripe 20 before reaching substrate 10. Thus in such arrangements, rather than interface 48 between adjacent edge surfaces of stripes 20 and 40 being substantially perpendicular to the major plane of substrate 80, interface 48 may run at an angle that is e.g. far removed from the perpendicular. Moreover, the angle of interface 48 does not necessarily have to be constant, again as illustrated in exemplary embodiment in FIG. 1. (In some such embodiments the angle of interface 48 may decrease as it approaches surface 21 of stripe 20, so that portion 25 may e.g. comprise a laterally-elongated flange portion as shown in FIG. 1.)

In such embodiments lateral edge portion 25 of first pressure-sensitive adhesive stripe 20 may thus comprise a first surface 27 that is in contact with surface 11 of substrate 10; and, at least some part of edge portion 25 may further comprise a second, generally oppositely-facing surface 28 that is in contact with (at interface 48) a surface 47 of a lateral edge portion 45 of second pressure-sensitive adhesive stripe 40. It will be appreciated from inspection of FIG. 1 that the condition that surface 28 (which contacts second adhesive 40) is "generally oppositely facing" with respect to major surface 27 (which contacts substrate 10) does not require that these two surfaces (of edge portion 25) must face diametrically away from each other, nor does it require that the orientation of the two surfaces remains constant over the lateral extent of lateral edge portion 25 of stripe 20. Rather, it merely implies that in lateral edge portion 45 of second adhesive stripe 40, surface area 47 of inward major surface 41 of second adhesive stripe 40, which area 47 would ordinarily be expected to contact substrate 10, is instead in contact with outward surface 28 of lateral edge portion 25 of first adhesive stripe 20 (at interface 48).

Significant advantages can be imparted by this general type of arrangement (which is referred to herein as surface enrichment of first adhesive 20). For example, a first pressure-sensitive adhesive 20 may provide enhanced performance in a particular application, or may comprise a property that is particularly useful in a given situation. However, such an adhesive may be e.g. more expensive than the second adhesive 40 (or there may be some other reason why it is desired to minimize the overall amount of first adhesive 20). The arrangements disclosed herein allow that in lateral edge portions 25, first adhesive 20 can be preferentially provided (e.g. in a relatively thin surface layer) against the surface of substrate 10 instead of second adhesive 40 being present in such locations. That is, the area of first surface 21 of first adhesive 20 that is against surface 11 of substrate 10 may be greater than that expected based on the overall amounts of the first and second adhesives in adhesive layer 5.

It will be appreciated that in the particular circumstance that substrate 10 is a release liner, upon the separation of adhesive layer 5 and release liner 10 from each other, surface 21 of first adhesive 20 that is thus exposed will be in position to be adhesively bonded to a surface, e.g. to a mounting surface of a building component. The enrichment of first adhesive 20 at this surface (compared e.g. to the fraction of first adhesive 20 at the opposite surface of adhesive layer 5) can thus provide enhanced bonding to certain surfaces while minimizing the amount of first adhesive 20 that is used in adhesive layer 5 as a whole. Conversely, the oppositely-facing side of adhesive layer 5 may become enriched in second adhesive 40 (although this may not always happen, as discussed later herein). This may be of little or no consequence since this oppositely-facing side of adhesive layer 5 may be e.g. bonded to a surface (e.g., of a tape backing) to which enhanced bonding is not required.

In embodiments of this type (e.g. as shown in FIG. 1), at least some of first adhesive stripes 20 may each comprise a laterally-central portion 26 with a second major surface 22 that faces generally opposite first major surface 21 of first adhesive stripe 20, which second major surface 22 of laterally-central portion 26 of first adhesive stripe 20 is not in contact with (e.g., is not covered by), second adhesive stripe 40. In other words, major surface 22 of laterally-central portion 26 may be an exposed surface after the formation of adhesive layer 5, so that exposed surface 22 can be e.g. bonded to e.g. a backing. Thus, at least portions of such an adhesive layer 5 may avoid the potential disadvantages of having an internal interfacial boundary that is present between first and second adhesives 20 and 40 and that extends over most or all of the area of adhesive layer 5. Such an arrangement can be differentiated from e.g. conventional multilayer coating of layers of different adhesives.

In further detail, a laterally-central portion 26 of a selected first stripe 20 may comprise first and second lateral edge portions 25 laterally extending therefrom on the side of stripe 20 that faces substrate 10, as shown in FIG. 1. For a first stripe 20 of this general type, the lateral width $w_{le}$ of each lateral edge portion 25 can be compared to the width $w_{lc}$ of laterally central portion 26, as shown in FIG. 1. In various embodiments, such a lateral width $w_{le}$ of a lateral edge portion 25 may be at least 10, 20, 40, or even 60% or more, of the lateral width $W_{lc}$ of laterally central portion 26. In further embodiments, such a lateral width of lateral edge portion 25 may be less than about 70, 50, 30, 20, or 10% of the lateral width of laterally central portion 26. The (total) substrate-side lateral width of each stripe 20 in which surface-enrichment is present, will be given by the sum $W_{lc}+w_{le}+w_{le}$. (It is noted however that in some embodiments a stripe of a first adhesive 20 might be surface-enriched only along one lateral edge, and might comprise an adhesive-free gap along its other lateral edge, in which case the substrate-side width of such a stripe would be $W_{lc}+w_{le}$). The opposite-side lateral width will be given by $W_{lc}$. In various embodiments, the substrate-side lateral width of a stripe 20, may be greater than the opposite-side lateral width of that stripe 20, by a factor of at least about 1.2, 1.6, 2.0, or 2.5.

The thickness $t_{le}$ of a lateral edge portion 25 may be compared to the average thickness $T_{lc}$ of laterally-central portion 26 of first adhesive stripe 20. Although the thickness $t_{le}$ may vary over the lateral extent of edge portion 25 (as shown in FIG. 1), a local thickness can be measured in any particular part of edge portion 25. Thus, in various embodiments, at least a part of lateral edge portion 25 of adhesive stripe 20 (e.g., toward the laterally-outermost edge of portion 25) may comprise a thickness $t_{le}$ that is less than about 60, 40, 20, or 10% of the average thickness $T_{lc}$ of the laterally-central portion 26 of first adhesive stripe 20.

Liner-Side & Opposite-Side Area Fractions

For each of first and second adhesives 20 and 40 on each major surface of adhesive layer 5, an area fraction can be defined that is the fraction (percentage) of the total area of that surface of adhesive layer 5 that is collectively provided by the stripes of that adhesive. The surface-enrichment of first adhesive 20 may be characterized in terms of the area fractions that are provided by each adhesive at each surface of adhesive layer 5. Specifically, for first adhesive 20 a substrate-side area fraction can be obtained, and an opposite-side area fraction can be obtained. If little or no surface-enrichment is present, the substrate-side and opposite-side area fractions for first adhesive 20 will typically be very similar to each other. However, if surface-enrichment is present the substrate-side area fraction and the opposite-side area fraction provided by first adhesive 20 may differ significantly from each other. (The same holds true for second adhesive 40).

In other words, the fraction that first adhesive 20 provides of the adhesive materials present at the surface of adhesive layer 5 that is in contact with substrate 10 can be determined. This can be compared to the fraction that first adhesive 20 provides of the adhesive materials present at the opposite surface of adhesive layer 5. When surface-enrichment is present at the substrate-side surface of adhesive layer 5, the difference between the substrate-side and opposite-side area fractions of first adhesive 20 (and corresponding parameters for second adhesive 40) can characterize the extent of such surface-enrichment. Specifically, the ratio of these two area fractions can be obtained. Thus to summarize with reference to FIG. 1, a measure of surface-enrichment at the surface 21 of adhesive layer 5 that is in contact with substrate 10, can be obtained by ratioing the area fraction that surface 21 occupies (of surfaces 21 and 41 of the first and second adhesives respectively) on the substrate side, to the area fraction that surface 22 occupies (of surfaces 22 and 42 of the first and second adhesives respectively) on the opposite side. Such a ratio can provide a quantitative measure of the surface enrichment of first adhesive 20 on the substrate-facing major surface of adhesive layer 5.

In embodiments in which little or no surface enrichment is present, such a surface-enrichment ratio may be about 1 (i.e., a baseline value). However, in embodiments in which surface enrichment occurs, such a ratio may be e.g. about 1.2, 1.4, 1.6, 1.0, 2.0, or 2.4. By way of illustration, in the exemplary representation of FIG. 1, the substrate-side area fraction provided by first surface 21 of first adhesive 20 appears to be in the range of 70% (assuming that the stripes are present at roughly equal nominal widths). The opposite-side area fraction provided by second surface 22 of first adhesive 20 appears to be in the range of 50%. Thus, the surface enrichment ratio would be about 70/50, or about 1.4.

In some embodiments, the general arrangement presented in FIG. 1 may be exploited to an extreme. That is, as shown in exemplary manner in FIG. 2, the lateral edge portions 25 and 25' of two first stripes 20 and 20' that laterally flank a second adhesive stripe 40, may extend so far laterally toward each other that they meet and thus completely underlie the second stripe 40. That is, in such cases essentially 100% of the adhesive surface area of adhesive layer 5 that contacts surface 11 of substrate 10, may be supplied by first adhesive 20. With arrangements such as this, the potential problem of failure at the interface between surface 28 of first adhesive 20, and surface 47 of second adhesive 40, does not seem to have been encountered (that is, constructions of this type still exhibit acceptable peel and shear strength). While not wishing to be limited by theory or mechanism, it may be that the particular manner in which such arrangements are achieved may result in stronger and/or longer-lasting interfacial bonding between the surfaces of the two adhesives. And, of course, the presence of laterally-central portions 26 of first adhesive 20, in which first adhesive 20 provides both of the bonding surfaces of adhesive layer 5, and extends continuously therebetween (with no interface between first adhesive 20 and second adhesive 40 being present in this area of adhesive layer 5), may also be beneficial.

It is noted that in embodiments in which surface enrichment occurs to the extent that two lateral edge portions 25 and 25' extend so far laterally toward each other that they meet, there may be no visibly obvious dividing line between the two stripes 20 and 20' from which each edge portion extended. In this special case, items 20 and 20' can still be considered to be individual stripes that are distinguishable from each other, and each can be considered to comprise an elongate length (i.e. in the direction in which each stripe was deposited onto the moving substrate 10) and a width. However, it is further noted that in the case of a conventional, laterally continuous adhesive layer that might be arbitrarily divided into lateral sections each with a width, such arbitrarily selectable sections or widths, that are not distinguishable from each other, cannot be equated with the term "stripes" as used herein. It is thus emphasized that (even in the case of essentially complete surface enrichment of first adhesive 20 at the surface of substrate 10), the stripe-coating arrangements presented herein are distinguished from those achieved by conventional multilayer coating, e.g. by coating a layer of a first adhesive onto a substrate and coating a layer of a second adhesive atop the first adhesive to achieve a multilayer stack. For example, at the very least such conventional multilayer approaches would not be expected to give rise to lateral edge portions 25 and 45 of stripes 20 and 40 with angled interfaces 48 therebetween, and which lateral edge portions 25 of a stripe 20 are readily distinguishable from a laterally-central portion 26 of the stripe, as discussed above.

Figure 3:
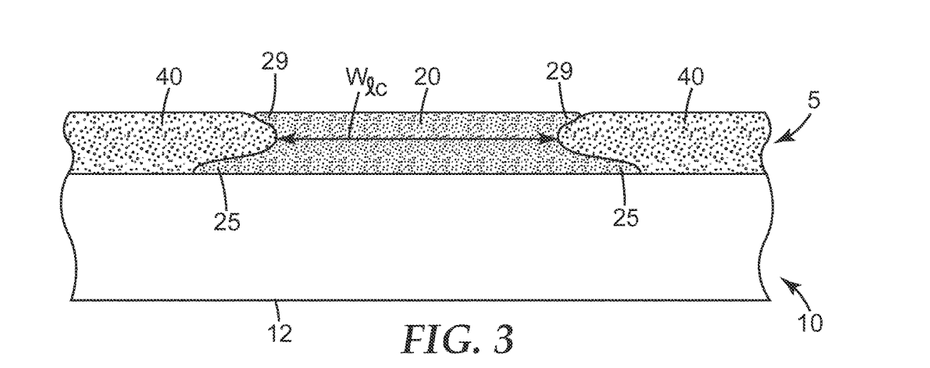
FIG. 3 is a schematic cross sectional slice view of a portion of another exemplary article as disclosed herein.

Although the above-discussed surface enrichment typically occurs primarily at the major surface of adhesive layer 5 that faces substrate 10, some surface enrichment has occasionally been observed at the oppositely-facing surface of adhesive layer 5, as shown in exemplary manner in FIG. 3. That is, a stripe of first adhesive 20 may exhibit one or more secondary lateral edge portions 29 on the opposite surface from the above-described lateral edge portions 25. Such arrangements may provide further advantages in allowing the surface area of exposed first adhesive 20 to be maximized on both bonding surfaces of adhesive layer 5, while using a minimal amount of first adhesive 20. In the special case in which some surface enrichment occurs at the opposite surface, the minimum lateral width of stripe 20 (e.g. as designated by the double-headed arrow of FIG. 3) is used as the opposite-side lateral width ($W_{lc}$) for purposes of comparison with the substrate-side lateral width, for calculation of area ratios, etc.)

The surface-enrichment of a first adhesive 20 at the substrate-facing surface of an adhesive layer 5 may provide advantages in any of a number of situations and applications. By way of illustration, Working Examples are presented herein in which first adhesive 20 is a silicone-based adhesive that is shown to impart enhanced ability to preserve an adhesive bond to a so-called architectural paint, even in the presence of e.g. high humidity. These results are demonstrated by way of an Elevated Humidity/Static Shear Test. It is emphasized however that the particular adhesives that were chosen, and the particular testing that was done, are illustrative in nature. Any first and second adhesives of differing properties may be used, for any suitable purpose, with the first adhesive being surface-enriched to achieve any desired end.

Volume Fractions

The above-presented arrangements can provide benefits by allowing the actual bonding surface area provided by a first adhesive to be greater than that which would be expected based on the volume fraction at which the first adhesive is present in adhesive layer 5. By the volume fraction provided by an adhesive (e.g., a first adhesive) is meant the fraction (percentage) of the total volume of adhesive layer 5 that is collectively occupied by the stripes of that adhesive.

In addition to the already-discussed surface-enrichment effects, the volume fraction at which first and second adhesives 20 and 40 are present in adhesive layer 5 may be manipulated by arranging for the thickness of the stripes of first adhesive 20 to be different from the thickness of stripes of second adhesive 40. In some embodiments, the thickness of the stripes of first adhesive 20 relative to that of the stripes of second adhesive 40, may be advantageously minimized so as to use a lower volume fraction of first adhesive 20. In such embodiments, the thickness of stripes of second adhesive 40 may be greater than that of first adhesive 20, by a factor of at least about 1.2, 1.6, 2.0, 2.5, or 3.0. In other embodiments, the thickness of the stripes of first adhesive 20 (more specifically, the thickness of the as-deposited flowable liquid precursor to first adhesive 20) may be advantageously increased relative to that of the stripes of second adhesive 40, e.g. so as to promote the surface-enrichment effect, as discussed later herein. In such embodiments, the thickness of stripes of first adhesive 20 may be greater than that of second adhesive 40, by a factor of at least about 1.2, 1.6, 2.0, 2.5, or 3.0. In some circumstances it may be desired that the average thickness of first adhesive stripes 20 be similar to the average thickness of second adhesive stripes 40. Thus in some embodiments, the average thickness of first adhesive stripes 20 is within plus or minus 40, 20, 10, or 5% of the average thickness of second adhesive stripes 40.

In various embodiments, first adhesive 20 may be provided at a volume fraction of at least about 30, 35, 40, 50, or 60%. (The balance of adhesive layer may be provided by second adhesive 40, alone or in combination with third or even fourth adhesives). In further embodiments, first adhesive 20 may be provided at a volume fraction of at most about 90, 85, 80, 70, 60, 50, or 40% (noting that Tables 1 and 2 denote arrangements in which the volume fraction of first adhesive 20 is estimated to be as high as about 82%).

Pressure-Sensitive Adhesives

First adhesive 20 and second adhesive 40 are both pressure-sensitive adhesives. (While the simplest example of a two-adhesive system is discussed herein, it will be appreciated that third, fourth, or even more adhesives can be present, if desired.) The only requirement is that first and second adhesives possess one property in which they differ from each other (specifically, some e.g. intensive property other than extensive (e.g., geometric) properties such as width and thickness). A property in which the first and second adhesives might differ might be (but is not limited to) one or more of melting point, glass transition temperature, elastic modulus, peel strength, shear strength, hardness, moisture-vapor transmission, water-repellency, oil absorption, solubility in water and/or in organic solvents, temperature resistance, UV-resistance, and so on. It will be appreciated such a difference in properties might be achieved e.g. by a difference in composition; however, even adhesives of very similar composition might exhibit different properties e.g. by way of having been exposed to a different processing history. That is, the first and second adhesive (whether similar in composition or not) might differ in e.g. percent crystallinity, free volume, crosslink density, and so on. In some embodiments, one or both of first and second adhesives 20 and 40 may be a repositionable adhesive. In alternative embodiments, neither of first and second adhesives 20 and 40 are repositionable.

Pressure-sensitive adhesives are normally tacky at room temperature and can be adhered to a surface by application of, at most, light finger pressure and thus may be distinguished from other types of adhesives that are not pressure-sensitive. A general description of pressure-sensitive adhesives may be found in the Encyclopedia of Polymer Science and Engineering, Vol. 13, Wiley-Interscience Publishers (New York, 1988). Additional description of pressure-sensitive adhesives may be found in the Encyclopedia of Polymer Science and Technology, Vol. 1, Interscience Publishers (New York, 1964). In at least some embodiments, a pressure-sensitive adhesive may meet the Dahlquist criterion described in Handbook of Pressure-Sensitive Adhesive Technology, D. Satas, $2^{nd}$ ed., page 172 (1989). This criterion defines a pressure-sensitive adhesive as one having a one-second creep compliance of greater than $1 \times 10^{-6}$ cm$^2$/dyne at its use temperature (for example, at temperatures in a range of from 15° C. to 35° C.).

Any suitable pressure-sensitive adhesive of any suitable composition and with any suitable properties may be used for either or both of first and second pressure-sensitive adhesives 20 and 40. In some embodiments, at least one of first and second adhesives 20 or 40 is a silicone-based pressure-sensitive adhesive. In some embodiments, first adhesive 20 is a first silicone-based adhesive with a first set of properties, and second adhesive 40 is a second silicone-based adhesive with a second set of properties (and that may differ in composition from the first adhesive). Such adhesives typically include at least one silicone elastomeric polymer, and that may contain other optional components such as tackifying resins. The silicone elastomeric polymer may be a silicone block copolymer elastomer comprising hard segments that each comprise at least one polar moiety. By a polar moiety is meant a urea linkage, an oxamide linkage, an amide linkage, a urethane linkage, or a urethane-urea linkage. Thus, suitable silicone block copolymer elastomers include for example, urea-based silicone copolymers, oxamide-based silicone copolymers, amide-based silicone copolymers, urethane-based silicone copolymers, and mixtures thereof. Such silicone-based pressure sensitive adhesives are described in detail in U.S. Patent Application 61/838,504, Entitled "Article Comprising Pressure-Sensitive Adhesive Stripes", filed evendate herewith, which is incorporated herein by reference in its entirety. Other silicone-based adhesives may be those based e.g. on thermally curable (e.g., platinum-cured, peroxide-cured, moisture-cured silicone polymers, etc.), as are well-known to the skilled artisan. Such silicones may not necessarily comprise any of the above-listed hard segments.

Silicone-based pressure-sensitive adhesive compositions (whether relying e.g. on a block copolymer with hard segments, or any other type of silicone elastomer) may often include an MQ tackifying resin. Silicone-based adhesives, of any of the above-discussed types and variations, may be provided in any suitable form to be formed into stripes 20 and/or 40. For example, such an adhesive may be provided in the form of a precursor liquid that is a flowable liquid that can be deposited onto substrate 10 to form stripes of the precursor liquid, which precursor can then be transformed into the silicone-based adhesive in its final form. Thus, a precursor flowable liquid might be e.g. a 100% solids mixture suitable for e.g. hot melt coating, or a water-borne emulsion (e.g. latex), or a solution in one or more suitable solvents, as discussed later herein.

In some embodiments, at least one of first and second adhesives 20 or 40 is an organic polymeric pressure-sensitive adhesive. In some embodiments, first adhesive 20 is a first organic polymeric adhesive with a first set of properties, and second adhesive 40 is a second organic polymeric adhesive with a second set of properties (and that may differ in composition from the first adhesive). An organic polymeric pressure-sensitive adhesive by definition includes less than 10 weight percent of a silicone-based pressure-sensitive adhesive (dry weight basis). In various embodiments, such an adhesive may comprise less than 4, 2 or 1% of a silicone-based adhesive. In many embodiments, such an adhesive will contain substantially no (i.e., less than 0.2 weight percent) of a silicone-based pressure-sensitive adhesive. It will however be appreciated that in some circumstances such an adhesive may comprise some small amount (e.g., less than 2.0, 1.0, 0.4, 0.2, 0.1, or 0.05 weight percent) of silicone-containing additive (e.g., emulsifier, plasticizer, stabilizer, wetting agent, etc.). Such circumstances, in which one or more silicone-containing additive(s) is/are present for some purpose other than imparting pressure-sensitive properties to the adhesive, cannot cause such an adhesive to be considered to be a silicone-based adhesive.

By organic polymeric pressure-sensitive adhesive is meant that the adhesive is based on at least one organic polymeric elastomer (optionally in combination with other components such as one or more tackifying resins). It will be appreciated that an organic polymeric adhesive does not have to be based on an organic polymeric elastomer that is purely hydrocarbon (although this may be done if desired). Rather, the presence of heteroatoms (such as O, N, Cl, and so on) is permitted (whether in the backbone of the elastomer chain and/or in a sidechain thereof), as long as the presence of the specific heteroatom Si is minimized according to the criteria outlined above.

General categories of exemplary materials which may be suitable for use in an organic polymeric pressure-sensitive adhesive include e.g. elastomeric polymers based on natural rubber; synthetic rubber (e.g., butyl rubber, nitrile rubber, polysulfide rubber); block copolymers; the reaction product of acrylate and/or methacrylate materials; and so on. (As used herein, terms such as (meth)acrylate, (meth(acrylic), and the like, refer to both acrylic/acrylate, and methacrylic/methacrylate, monomer, oligomers, and polymers derived therefrom). Specific polymers and/or copolymers and/or monomer units suitable for inclusion in such an elastomeric polymer of such an adhesive may include, but are not limited to: polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers, styrene polymers, poly-alpha-olefins, amorphous polyolefins, ethylene vinyl acetates, polyurethanes, silicone-urea polymers, polyvinylpyrrolidones, and any combinations (blends, copolymers, etc.) thereof. Examples of suitable (meth)acrylic materials include polymers of alkyl acrylate or methacrylate monomers such as e.g. methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, and combinations thereof. Examples of suitable commercially available block copolymers include those available under the trade designation KRATON from Kraton Polymers, Houston, Tex. Any of these or other suitable materials may be used in any desired combination. A general description of some useful organic polymeric pressure-sensitive adhesives may be found in the Encyclopedia of Polymer Science and Engineering, Vol. 13, Wiley-Interscience Publishers (New York, 1988). Additional descriptions of some useful organic polymeric pressure-sensitive adhesives may be found in the Encyclopedia of Polymer Science and Technology, Vol. 1, Interscience Publishers (New York, 1964).

If desired, a tackifying resin may be included in an organic polymeric adhesive. (Those of ordinary skill will appreciate that some elastomers may be self-tacky and thus may require little or no added tackifying resin.) Any suitable tackifying resin or combination thereof may be used. Suitable tackifying resins may include e.g. wood rosins and hydrogenated derivatives thereof, tall oil rosins, terpene resins, phenolic resins, polyaromatics, petroleum-based resins, (e.g. aliphatic C5 olefin-derived resins) and so on. Additionally, pressure-sensitive adhesive 40 can contain additives such as plasticizers, fillers, antioxidants, stabilizers, pigments, and the like.

It may be convenient (e.g., for masking and/or stretch-release uses), that the components of an organic pressure-sensitive adhesive be chosen so as to provide good adhesion to a surface, while also being removable under moderate force without leaving a residue, e.g. a visible residue. In certain embodiments, a pressure-sensitive adhesive may be natural-rubber-based, meaning that a natural rubber elastomer or elastomers make up at least about 70 wt. % of the elastomeric components of the adhesive (not including any filler, tackifying resin, etc.). In some embodiments, the organic polymeric elastomer may be a hydrocarbon block copolymer elastomer (e.g., of the general type available under the trade designation KRATON from Kraton Polymers, Houston, Tex.). In specific embodiments, the block copolymer elastomer may be e.g. a styrene-butadiene-styrene (SBS) or a styrene-isoprene-styrene (SIS) block copolymer, a blend of the two, blend of either of both of these with a natural rubber elastomer, and so on (along with e.g. at least one tackifying resin).

Organic polymeric adhesives, of any of the above-discussed types and variations, may be provided in any suitable form to be formed into stripes 20 and/or 40. For example, such an adhesive may be provided in the form of a precursor liquid that is a flowable liquid that can be deposited onto a substrate 10 to form stripes of the precursor liquid, which precursor can then be transformed into the organic polymeric adhesive in its final form. Thus, a precursor flowable liquid might be e.g. a 100% solids mixture suitable for e.g. hot melt coating, or a water-borne emulsion (e.g. latex), or a solution in one or more suitable solvents, as discussed later herein.

Substrate

Substrate 10 can be any suitable substrate upon which is it desired to dispose (e.g., by coating) adhesive layer 5, whether temporarily or permanently. In many embodiments, substrate 10 may be a release liner. Such a release liner 10 may comprise a release surface on first major surface 11, which release surface is suitable for releasing of a pressure-sensitive adhesive therefrom. Release liner 10 may optionally comprise a release surface, on second major surface 12. In particular embodiments, the release surface on second major surface 12 may comprise the same, or different, release properties from those of first major surface 11 (in the latter case, liner 10 will thus be a so-called differential-release liner, as will be well understood by the ordinary artisan).

Release surface 11 (and release surface 12, if present) can be provided by any suitable material (or, by any suitable treatment of the surface of the material of which release liner 10 is made). In cases in which adhesive layer 5 comprises e.g. organic polymeric adhesives with little or no silicone-based adhesives, such a release surface might be e.g. any suitable coating, for example wax or the like. Or, any suitable high molecular weight polymeric layer (e.g., coating) might be used, e.g. a polyolefin layer such as polyethylene and so on. It will be appreciated that numerous layers and treatments will be suitable for such use.

If adhesive layer 5 comprises a significant amount of silicone-based adhesive, it may be advantageous to provide release surface 11 with a composition that enhances the ability of a silicone-based adhesive to be released therefrom. Fluorinated materials are often used for such purposes. Examples of potentially suitable materials include, but are not limited to, fluorinated materials such as e.g. fluorochemicals, fluorocarbons, fluorosilicones, perfluoropolyethers, perfluorinated polyurethanes, and combinations thereof. In particular embodiments, the fluorinated release surface is provided by a fluorosilicone polymer. Particularly useful fluorosilicone release coatings may include the reaction product of a fluorosilicone polymer, an organohydrogenpolysiloxane crosslinking agent and a platinum-containing catalyst. A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7786 and SYL-OFF Q2-7785. One example of a useful release liner is a fluoroalkyl silicone polycoated paper.

Substrate (e.g., release liner) 10 can be of a variety of forms including, e.g., sheet, web, tape, and film. Examples of suitable materials include, e.g., paper (e.g., kraft paper, poly-coated paper and the like), polymer films (e.g., polyethylene, polypropylene and polyester), composite liners, and combinations thereof. Release liners can optionally include a variety of markings and indicia including, e.g., lines, art work, brand indicia, and other information.

In some embodiments, substrate 10 may not be a release liner. In such embodiments, adhesive layer 5 may be bonded permanently to substrate 10 (meaning that the adhesive layer and the substrate cannot be removed from each other without unacceptably damaging or destroying one of both of them). In such embodiments, substrate 10 can be any backing (i.e., a tape backing) suitable for making any suitable kind of tape (masking tape, sealing tape, strapping tape, filament tape, packaging tape, duct tape, electrical tape, medical/surgical tape, and so on). Backing 10 can take any suitable form including, e.g. polymer films, paper, cardboard, stock card, woven and nonwoven webs, fiber reinforced films, foams, composite film-foams, and combinations thereof. Backing 10 may be comprised of any suitable material including e.g. fibers, cellulose, cellophane, wood, foam, and synthetic polymeric materials including, e.g., polyolefins (e.g., polyethylene, polypropylene, and copolymers and blends thereof); vinyl copolymers (e.g., polyvinyl chlorides, polyvinyl acetates); olefinic copolymers (e.g., ethylene/methacrylate copolymers, ethylene/vinyl acetate copolymers, acrylonitrile-butadiene-styrene copolymers, and so on); acrylic polymers and copolymers; and polyurethanes. Blends of any of these may be used. In particular embodiments, oriented (e.g., uniaxially or biaxially oriented) materials such as e.g. biaxially-oriented polypropylene may be used. Regardless of the specific nature and purpose of substrate 10, adhesive layer 5 can be provided across substantially the entirety of the width of substrate 10; or, a border may be provided along one or both edges of substrate 10 in which adhesive layer 5 is not present, if desired.

Secondary Substrate

In some embodiments, the side of primary adhesive layer 5 that is opposite substrate 10 can be bonded to a secondary substrate, which bonding may be temporary or permanent as desired. As such, a secondary substrate might be any of the release liners described above. In other embodiments, such a substrate can be any backing such as any of the above-described tape backings.

In some embodiments, a substrate (whether substrate 10, or a secondary substrate) may be highly extensible so that in combination with adhesive layer 5 it forms a stretch-releasable article. The term "highly extensible" as used herein means that when the backing is stretched along its long axis, an elongation of at least about 150% is achieved without rupture or breakage of the backing. In such embodiments, such a backing may be capable of achieving an elongation of e.g. about 350, 550, or 750%. Suitable highly extensible backings may include e.g. a single layer of foam, multiple layers of foam, a single layer of film, multiple layers of film and combinations thereof. Such materials may be selected to optimize properties such as conformability and resiliency, which are useful when the article is to be adhered to surfaces having surface irregularities, e.g., painted drywall. Such a foam or film layer may be prepared from a variety of thermoplastic polymers including, e.g., polyolefins, vinyl polymers and/or copolymers olefinic copolymers, acrylic polymers and copolymers; polyurethanes; and so on. In some embodiments it may be particularly advantageous that a backing comprise a relatively thick and conformable polymeric foam. In various embodiments, a backing may comprise a polymeric foam with a thickness of at least about 0.2, 0.4, 0.8, or 1.2 mm. In further embodiments, such a polymeric foam may comprise a thickness of at most about 8, 4, or 2 mm. In various embodiments, such a polymeric foam may comprise a density of at least about 1, 2, 4 or 6 pounds per cubic foot. In further embodiments, such a polymeric foam may comprise a density of at most about 30, 20 or 10 pounds per cubic foot.

In some embodiments adhesive layer 5 may be used in a stand-alone manner, e.g. as a stretch-release article that is not being laminated to e.g. a highly extensible backing. In such cases, first substrate 10, and the second substrate, may both be release liners, and adhesive layer 5 may be e.g. thick enough to handle and to provide other useful properties when separated from one or both release liners. Thus, in such embodiments adhesive layer 5 may comprise an average thickness of from at least about 5, 10, 15 or 20 mils, to about 100, 80, 60, or 40 mils. In such embodiments, adhesive layer 5 should of course comprise sufficient mechanical integrity to be handleable (in the absence of either release liner, if necessary). Thus, in at least some such embodiments stripes 20 and 40 should comprise sufficient bonding of adjacent stripes to each other to provide adhesive layer 5 as a whole with sufficient mechanical integrity.

Methods of Making

Stripes of first adhesive 20 and second adhesive 40 may be deposited on major surface 11 of substrate 10 e.g. by any method that allows the acceptable formation of stripes with surface-enrichment of first adhesive 20. In general, a precursor to first adhesive 20, and a precursor to second adhesive 40, may each be deposited onto substrate 10 as a flowable liquid in any suitable form. For example, such a flowable liquid might be a 100% solids composition (e.g. a hot-melt coating composition) that is deposited followed by the reaction of functional groups (e.g., crosslinking, polymerization, oligomerization, etc.) to impart the desired adhesive properties to the final product. Or, such a flowable liquid might be a water-borne coating (e.g., a latex or emulsion), that is deposited followed e.g. by drying to remove the water, and by any reaction/crosslinking if needed. In particular embodiments, first adhesive 20 and second adhesive 40 may be solvent coated—that is, each adhesive may be solubilized in an appropriate solvent (or solvent mixture) to form a coating solution that may be coated onto substrate 10 followed by removal of the solvent(s), and by any reaction/crosslinking etc. if needed. In other words, a coating solution of each adhesive may be formed by dissolving the elastomer(s) (and tackifier(s) if present) in a solution, along with any other desired additives or ingredients, with one or more solvents that can adequately solubilize the ingredients. In such embodiments, the precursor flowable liquids for the first and second adhesives by definition are not 100% solids compositions (e.g., hot melt coatable and/or extrudable compositions) and the resulting article comprises a solvent-coated adhesive layer rather than e.g. a hot-melt-coated layer or extruded layer.

Each stripe of an adhesive can be formed by expelling the precursor flowable liquid (e.g., coating solution) through an opening in a coating die, onto a moving surface 11 of substrate 10. Multiple stripes of e.g. first adhesive 20 can be obtained by simultaneously expelling the first precursor flowable liquid through multiple, laterally-spaced openings of the die, which may be achieved e.g. by the use of a slot die with one or more shims provided therein to block off portions of the slot and to leave other portions of the slot open for the coating solution to pass therethrough. The same can be done for second adhesive 40 (so that the streams of the first liquid, and the streams of the second liquid, are expelled simultaneously from the various openings, and so that the streams of both liquids land essentially simultaneously on the surface of the substrate). Generally alternating stripes of first adhesive 20 and second adhesive 40 may be achieved by variations on the above general approaches. For example, an approach may be used in which the first and second coating solutions are fed (e.g. from first and second separate manifolds) to a dual layer slot die, in an arrangement in which each solution passes through a shim with laterally spaced-apart openings that dictate the nominal thickness, lateral width, and lateral pitch (center-to-center distance) of the stripes of that adhesive. The two shims can be registered relative to each other so that so that the stripes of the two adhesives are generally alternating as desired. Such arrangements are described in e.g. U.S. Patent Application Publication 2009/0162595 to Ko.

It will be appreciated that this is merely one example and that many possible variations exist of this general approach of delivering precursor flowable liquids (e.g., coating solutions) through a die onto surface 11 of moving substrate 10 to form generally alternating stripes of first and second adhesives. In general, some such processes may involve configurations in which a coating die is positioned relatively far from substrate 10 (e.g., in so-called extrusion coating or curtain coating). Some such processes may use e.g. a drop die, for example a multiple-orifice drop die as disclosed in U.S. Patent Application Publication 2002/0108564 to Gruenewald. Or, some such processes may involve situations in which the coating die is positioned in close proximity to substrate 10 (e.g., so-called contact coating). As mentioned, a dual-layer slot die may be used in which two shims (that are registered with each other) are used to respectively control the flow of the two liquids to be coated. Or, the set of shims might be integrated together into a single uniform piece (e.g., in the manner mentioned in U.S. Patent Application Publication 2009/0162595 to Ko). Still further, the shims and/or flow passages might be e.g. machined into the die so as to be integrated as part of the die itself, again as mentioned by Ko. The dimensions of the openings, the flowrates of the various streams, and so on, can be manipulated so as to deposit the various streams at desired thicknesses so as to achieve any desired thickness of the resulting adhesive stripes. Likewise, the placement and dimensions of the openings can be manipulated so as to provide adhesive-free gaps between at least some of the resulting adhesive stripes, as desired.

In some embodiments, the deposited stripes of precursor flowable liquid (e.g. coating solution) may, before any significant evaporation of solvent and/or solidification of the coated material has occurred, pass through a thickness-control gap between substrate 10 and a thickness-control member, e.g. in similar manner as described in U.S. Pat. No. 6,803,076 to Loukusa. Such an arrangement might be used e.g. to reduce the thickness of at least some of the stripes, to minimize variations in the thickness of individual stripes and/or to reduce variation between the thickness of different stripes, or in general to control or modify the thickness of any of the stripes in any useful manner. In particular, such a process may be used to promote or enhance the herein-described lateral spreading of one or more of stripes 20 so that at least one edge of such stripes 20 laterally displaces an adjacent edge of stripe 40. Such a thickness-control member might be e.g. a rod, a knife, a roller, a blade, or a die lip (e.g. positioned downweb along the path of substrate 10 from the die openings). In some embodiments, a moving fluid may be impinged onto the deposited stripes to similar effect, e.g. by use of an air-knife positioned downweb of the coating die. In other embodiments, no such passing of the deposited stripe through such a thickness-control gap, and/or use of an air-knife, may occur.

The above operations may be conveniently done by simultaneously depositing all of the stripes of first and second adhesives 20 and 40 onto substrate 10, in a single pass of substrate 10 past a coating die. Such simultaneous coating operations may be distinguished from e.g. coating operations in which one or more stripes or layers of one adhesive are deposited in a first pass, and one or more stripes or layers of a second adhesive are deposited in a second pass. They may also be distinguished from e.g. non-simultaneous (sequential) coating of two different adhesives (in e.g. stripes or layers), even if such sequential coatings are performed in-line in the same coating line.

Regardless of the particular manner in which precursor flowable liquids (e.g. coating solutions) are delivered to surface 11 of moving substrate 10, in any such approach each precursor liquid is deposited (coated) onto surface 11 of substrate 10 as a stripe that is elongated in the direction of motion of substrate 10. The solvent(s) can then be removed (e.g., by passing liner 10 through an oven) to leave behind each dried adhesive composition as an elongated stripe of the final desired thickness, width, pitch, and so on. Of course, if any reactive/functional components are present in the precursor liquid, they may react, polymerize, etc., to provide the final desired product, either instead of, or in addition to, any solidification that occurs by way of removal of a coating solvent or of water. Such reaction may be promoted by e.g. temperature, radiation, or any commonly used method.

It will be appreciated that various parameters in the solidification (e.g., drying and/or curing) process may be usefully controlled as desired. In particular, the dwell time of the precursor flowable liquid in a relatively low-viscosity condition may be controlled so as to promote (and/or to limit) the presence and/or amount of any lateral displacement of a precursor stripe by the lateral edges of a laterally-adjacent precursor stripe. (Based on the discussions above, it will be appreciated that this may allow the degree of surface enrichment in the resulting adhesive layer to be advantageously manipulated.) Thus for example, the distance from the coating die to any drying oven, the speed at which the substrate is moving, the temperature of the oven, and so on, can all be controlled as desired.

In at least some embodiments, liquid-coating has been found to play a useful role in the herein-described surface-enrichment (i.e., the ability to provide a higher fraction of first adhesive 20 in the substrate 10-facing surface of adhesive layer 5 than is present in an overall manner in adhesive layer 5). Such coating processes have been found to be effective in promoting preferential displacement of one precursor flowable liquid by another, even on such very low surface energy surfaces as the fluorinated surfaces of e.g. fluorosilicone release liners. As is known by the skilled artisan, fluorinated surfaces such as e.g. fluorosilicones are very low in surface energy (i.e., they may exhibit surface energies that may be in the teens, or even in single digits, in dynes/cm). Such surfaces are thus expected to be difficult to wet, particularly by liquids that have comparatively high surface energies (e.g., liquids comprising high-surface-energy-imparting polar groups).

As documented in the Working Examples herein, commonplace organic polymeric adhesives may be coated out of very non-polar coating solutions (e.g., out of toluene and the like). In contrast, silicone-based adhesives, particularly those comprising polar moieties (e.g., urea linkages, polyoxamide linkages, and so on), are often coated out of coating solutions that are considerably more polar (e.g., a mixture of isopropyl alcohol and toluene for exemplary silicone-polyurea materials, and a mixture of isopropyl alcohol, ethyl acetate, and toluene for exemplary silicone-polyoxamide materials). It would thus be expected that relatively non-polar coating solutions (e.g., comprising toluene as the only solvent) would be more able to wet such a low energy surface as a fluorosilicone surface of a release liner, in comparison to coating solutions comprising appreciable amounts of e.g. isopropyl alcohol and/or ethyl acetate. However, as documented in the Working Examples herein, the inventors have been able to obtain enrichment of silicone-based adhesive stripes 20, relative to organic polymeric adhesive stripes 40, on the surface of an adhesive layer 5 that is in contact with the fluorosilicone surface of a release liner. This indicates that the coating solutions of these silicone adhesives may be able to preferentially displace the coating solutions of the organic polymeric adhesives on the surface of the fluorosilicone release liner, even though the coating solutions of the silicone-based adhesives should have a higher surface energy than those of the organic polymeric adhesives. Based on these factors, the herein-described surface enrichment would be unexpected to the skilled artisan.

It should be noted that it is possible that at least some of any such displacement of the organic polymeric adhesive coating solution by the silicone-based adhesive coating solution might occur in the later stages of the process, e.g. after significant portions of the solvent(s) have been removed from the respective coating solutions. As such, it might be conjectured that a lower surface energy of a silicone-based adhesive itself (in comparison to that of the organic polymeric adhesive) might play a role. However (possibly due to an effect in which the presence in certain silicone adhesives of high-surface-energy imparting polar moieties such as urea or oxamide linkages, etc., may somewhat offset the low surface energy of e.g. polysiloxane portions of the silicone adhesives), the surface energies of exemplary silicone-based adhesives comprising such polar moieties have not been found to be significantly lower than the surface energy of exemplary organic polymeric adhesives. Specifically, surface energies in the range of 34 dyne/cm have been found for exemplary silicone-based adhesives, versus in the range of 39 dyne/cm for exemplary organic polymeric adhesives (both of which are far above the surface energy of typical fluorosilicone surfaces).

Thus, the surface-enrichment that is described herein and that is documented in numerous Working Examples, remains a surprising result that would not be expected based on the properties of the various adhesives themselves and/or their precursor coating solutions, or on the properties of fluorinated release liners. Nor would it be expected based on the known behavior of e.g. die-coating operations as customarily performed by those of skill in the art.

Once the coating/solidification is process is complete (that is, when stripes of adhesive 20 and 40 are in their final form so as to collectively comprise adhesive layer 5 upon major surface 11 of substrate 10), substrate 10 bearing adhesive layer 5 thereupon can be e.g. wound and stored as a continuous roll until ready for further processing. In some embodiments, substrate 10 may comprise a release coating, e.g. a fluorosilicone release coating, on surface 12 to ensure that the roll can be unwound as desired. Or, substrate 10 bearing adhesive layer 5 thereupon can be further processed without being rolled up and/or stored, as desired. In some embodiments adhesive layer 5 can be adhesively bonded (e.g., laminated) to a tape backing e.g. to form a pressure-sensitive adhesive tape. In some embodiments such an adhesive tape can be a single-faced (sided) tape. In other embodiments, a second adhesive layer (and a second release liner, if desired) can be laminated to the opposite side of the tape backing to form a double-faced adhesive tape. If desired, such a tape backing can be highly extensible so that the formed tape (whether single or double faced) can serve as a stretch-releasable adhesive tape.

LIST OF EXEMPLARY EMBODIMENTS

Embodiment 1

A method of making an article, the method comprising: simultaneously expelling a first precursor liquid of a first pressure-sensitive adhesive through a first set of multiple, laterally-spaced-apart openings in a coating die and simultaneously expelling a second precursor coating liquid of a second pressure-sensitive adhesive through a second set of multiple, laterally-spaced-apart openings in the same coating die, wherein the openings of the first set and the openings of the second set are arranged in a generally alternating pattern with each other so that generally-alternating streams of the first and second precursor liquids are expelled therefrom and are deposited onto a surface of a substrate that is continuously moving past the coating die; allowing, for at least selected laterally-adjacent streams of the first and second precursor liquids, a lateral edge of the deposited first precursor liquid to laterally displace a lateral edge of the deposited second precursor liquid at the surface of the substrate, and, solidifying the first precursor liquid into the first pressure-sensitive adhesive and solidifying the second precursor liquid into the second pressure-sensitive adhesive, thereby forming generally alternating stripes of the first and second pressure-sensitive adhesives on the substrate, wherein at least for selected stripes, the lateral displacing of a lateral edge of the second precursor liquid by a lateral edge of the first precursor liquid at the surface of the substrate causes a lateral edge portion of the first pressure-sensitive adhesive stripe to inwardly underlie, and to be in contact with, a lateral edge portion of a laterally-adjacent second pressure-sensitive adhesive stripe, and causes a substrate-side lateral width of the first pressure-sensitive adhesive stripe to be greater than an opposite-side lateral width of the first pressure-sensitive adhesive stripe by a factor of at least about 1.2.

Embodiment 2

The method of embodiment 1 wherein the first and second precursor liquids are first and second coating solutions.

Embodiment 3

The method of embodiment 2 wherein the first and second coating solutions comprise first and second pressure-sensitive adhesive compositions each dissolved in a solution comprising one or more organic solvents.

Embodiment 4

The method of any of embodiments 1-3, wherein after the selected streams of the first precursor liquid and the second precursor liquid are deposited on the surface of the substrate and before the precursor liquids are solidified, the deposited first precursor liquid comprises a thickness that is at least about 1.4 times the thickness of the deposited second precursor liquid.

Embodiment 5

The method of embodiment 4 wherein the deposited first and second precursor liquids, prior to being solidified, are passed through a thickness-control gap that defines a distance between a thickness-control member and the surface of the substrate, which thickness-control gap is shorter in height than a thickness of the deposited first precursor liquid.

Embodiment 6

The method of any of embodiments 1-5, wherein the substrate is a release liner.

Embodiment 7

The method of any of embodiments 1-6, wherein the first pressure-sensitive adhesive is a silicone-based pressure-sensitive adhesive and wherein the second pressure-sensitive adhesive is an organic polymeric pressure-sensitive adhesive.

Embodiment 8

The method of embodiment 7, wherein the organic polymeric pressure-sensitive adhesive comprises an organic elastomer selected from the group consisting of styrenic block copolymer elastomers, natural rubber elastomers, (meth) acrylate elastomers, and mixtures and blends thereof.

Embodiment 9

The method of any of embodiments 1-8 wherein at least selected streams of the first precursor liquid are laterally flanked by first and second streams of the second precursor liquid, and wherein first and second lateral edges of the first precursor liquid are caused to laterally displace lateral edges of the first and second streams of the second precursor liquid at the surface of the substrate.

Embodiment 10

The method of any of embodiments 1-9 wherein the solidifying of the first and second precursor liquids comprises the evaporation of solvent from both liquids.

Embodiment 11

The method of any of embodiments 1-10 wherein the solidifying of the first and second precursor liquids comprises the reaction of functional groups in at least one of the first and second precursor liquids.

Embodiment 12

The method of any of embodiments 1-11, further comprising the step of contacting major surfaces of the generally alternating stripes of the first and second pressure-sensitive adhesives, which major surfaces face oppositely from the substrate, to a highly extensible tape backing and bonding the stripes of the first and second pressure-sensitive adhesive to the highly extensible tape backing to form a stretch-releasable tape article.

Embodiment 13

An article comprising: a substrate comprising a first major surface; a primary adhesive layer disposed on the first major surface of the substrate, wherein the primary adhesive layer comprises a plurality of stripes of a first pressure-sensitive adhesive and of a second pressure-sensitive adhesive, arranged in a generally alternating pattern across a lateral extent of the substrate; wherein for at least for selected stripes of the first pressure-sensitive adhesive, a lateral edge portion of the first pressure-sensitive adhesive stripe inwardly underlies, and is in contact with, a lateral edge portion of a second pressure-sensitive adhesive stripe that is laterally adjacent to the first pressure-sensitive adhesive stripe, and, a substrate-side lateral width of the first pressure-sensitive adhesive stripe is greater than an opposite-side lateral width of the first pressure-sensitive adhesive stripe by a factor of at least about 1.2.

Embodiment 14

The article of embodiment 13, wherein the first pressure-sensitive adhesive stripe comprises a laterally-central portion with a second major surface that faces generally opposite the first major surface of the first pressure-sensitive adhesive stripe, which second major surface of the laterally-central portion of the first pressure-sensitive adhesive stripe is not in contact with or covered by the second pressure-sensitive adhesive stripe.

Embodiment 15

The article of embodiment 14 wherein at least a part of the lateral edge portion of the first pressure-sensitive adhesive stripe comprises a thickness that is less than about 20% of an average thickness of the laterally-central portion of the first pressure-sensitive adhesive stripe.

Embodiment 16

The article of any of embodiments 14-15 wherein the lateral edge portion of the first pressure-sensitive adhesive stripe comprises an average lateral width that is at least 20% of an average lateral width of the laterally-central portion of the first pressure-sensitive adhesive strip.

Embodiment 17

The article of any of embodiments 13-16, wherein the first pressure-sensitive adhesive provides a substrate-side area fraction on the substrate-facing surface of the primary adhesive layer and provides an opposite-side area fraction on the side of the primary adhesive layer that is opposite the substrate, and wherein the primary adhesive layer exhibits a first pressure-sensitive adhesive surface-enrichment factor that is the ratio of the substrate-side area fraction of the first pressure-sensitive adhesive to the opposite-side area fraction of the first pressure-sensitive adhesive, and wherein the first pressure-sensitive adhesive surface-enrichment ratio is at least about 1.2.

Embodiment 18

The article of embodiment 17, wherein the first pressure-sensitive adhesive surface-enrichment ratio is at least about 1.6.

Embodiment 19

The article of any of embodiments 13-18, wherein the first pressure-sensitive adhesive provides a volume fraction of the primary adhesive layer that is from about 30% to about 90%.

Embodiment 20

The article of any of embodiments 13-19, wherein the first pressure-sensitive adhesive provides a volume fraction of the primary adhesive layer that is from about 40% to about 80%.

Embodiment 21

The article of any of embodiments 13-20, wherein the first pressure-sensitive adhesive provides an overall area fraction, on a side of the primary adhesive layer that is opposite the substrate, of from greater than about 20%, to about 70%.

Embodiment 22

The article of any of embodiments 13-21, wherein the first pressure-sensitive adhesive provides an overall area fraction, on a side of the primary adhesive layer that is opposite the first substrate, of from greater than about 30%, to about 60%.

Embodiment 23

The article of any of embodiments 13-22, made by the method of any of embodiments 1-12.

EXAMPLES

Test Procedures

Test procedures used in the Examples include the following.

Measurement of Stripe Parameters

To perform thickness measurements of stripes, samples were cut with a sharp razorblade at random locations and thicknesses determined optically via an Olympus Optical Microscope. All measurements were recorded in mils (thousandths of an inch).

Stripe width and stripe pitch (center-to-center distance between adjacent stripes or sub-stripes) were measured using an Olympus Optical Microscope. At least three measurements were taken at random locations on the sample and averaged. Even in the presence of substrate-side surface-enrichment, it was usually possible to obtain the substrate-side and opposite-side widths of the first and second stripes by optical inspection. That is, with backlit samples, areas in which the lateral portions of two adhesive stripes of adhesive overlapped (i.e., area $w_{le}$ as shown in FIG. 1) typically exhibited at least a slight opacity or whitening (thought to be caused by slight interfacial effects between the two adhesives) in comparison to the relatively transparent stripes of each adhesive. So, for any given stripe of e.g. first adhesive 20, optical inspection could usually provide the substrate-side width of the stripe (corresponding to the herein-mentioned $W_{lc}$ plus two times $w_{le}$) and also the opposite-side width of the stripe. As mentioned, the opposite-side width of a stripe was usually measured by optical inspection of that surface of the stripe; that is, it usually corresponded to $W_{lc}$ as shown in FIG. 1. The exception was cases in which slight surface-enrichment was present at the opposite side of the stripe (as illustrated in the exemplary embodiment of FIG. 3). In such cases, the minimum width of the stripe (as denoted by the double-headed arrow in FIG. 3) was used as the opposite-side width $W_{lc}$. Such minimum widths could be obtained by e.g. cutting cross-sectional samples in similar manner as described above for obtaining stripe thicknesses.

Area Fractions and Volume Fractions

The various area fractions described herein could be straightforwardly calculated from the average widths of the stripes. Volume fractions could also be calculated from the average widths of the stripes, by further taking into account the thicknesses of the adhesive stripes. The volume fractions herein are nominal numbers obtained from measurements of the opposite-side widths and area fractions of the respective stripes, with a +5% correction factor applied thereto based on the known surface enrichment at the substrate side. These volume fractions are marked accordingly in the Tables.

Elevated Humidity/Static Shear Test Method

Elevated Humidity/Static Shear Test Method tests were performed in generally similar manner to those outlined in U.S. Patent Application No. 61/838,504, Entitled "Article Comprising Pressure-Sensitive Adhesive Stripes", filed evendate herewith.

Materials

Substrate (Release Liner) and Tape Backing

Fluorosilicone release liner of the general type designated as SYL-OFF Q2-7785, and multilayer composite foam laminate backing (thickness approximately 36 mils), were obtained, of the types described in the Examples section of U.S. Pat. No. 8,344,037 (Sherman).

Organic Polymeric Pressure-Sensitive Adhesive Coating Solution

An organic polymeric pressure-sensitive adhesive composition comprising styrene-butadiene-styrene block copolymer elastomers was prepared generally according to composition D of U.S. Pat. No. 6,231,962 (Bries). The solution as prepared comprised this adhesive composition at approximately 43 wt. % (total) solids in toluene, and was diluted with toluene to approximately 35% solids to form a coating solution. The coating solution exhibited a viscosity (Brookfield LVT, #3 spindle, 6 rpm, for this and all other viscosities listed here) in the range of approximately 1500 cP. This adhesive was designated as PSA-O-1. All stripes of organic polymeric adhesive in the following Working Examples used this adhesive.

Silicone-Based Pressure-Sensitive Adhesive Coating Solution—SPU

A pressure-sensitive adhesive composition was prepared that comprised a silicone-polyurea (SPU) elastomer in combination with a functional MQ resin. The composition was prepared generally according to Example 27 of U.S. Pat. No. 6,569,521 (Sheridan), with the difference that the ratio of components was altered to achieve a pressure-sensitive adhesive composition with MW PDMS diamine/moles Dytek A polyamine/% by weight MQ resin of 33000/0.5/50 (that is, with the silicone-polyurea elastomer and the MQ resin being at an approximately 50/50 weight ratio). The coating solution comprised this adhesive composition at approximately 30 wt. % total solids in a 70/30 (wt. %) blend of toluene/isopropanol. The coating solution exhibited a viscosity of approximately 8700 cP. This adhesive was designated as PSA-S-1.

Silicone-Based Pressure-Sensitive Adhesive Precursor Coating Solution—SPOx

A pressure-sensitive adhesive composition was obtained that comprised a silicone-polyoxamide (SPOx) elastomer in combination with a functional MQ resin. The silicone-polyoxamide elastomer was believed to be similar in structure and properties to the elastomer described as "PSA 2" in the Working Examples of U.S. Patent Application Publication No. 2009/0229732 (Determan). The functional MQ resin was procured from GE under the trade designation SR-545 (as was the MQ resin used in PSA-S-1). The silicone-polyoxamide elastomer and the MQ resin were at a 50/50 weight ratio. The coating solution comprised this adhesive composition at approximately 35 wt. % total solids in a 60/20/20 (wt. %) blend of ethyl acetate/isopropanol/toluene. The coating solution exhibited a viscosity of approximately 7600 cP. This adhesive was designated as PSA-S-2. The stripes of silicone-based adhesives in Tables 1 and 2 used this silicone-based adhesive.

Coating Process

Representative Coating Process

The coating solutions were wet coated on the SYL-OFF Q2-7785 release liner in stripes using a dual layer slot die. The two layers of the slot die were fed from separate manifolds (one to feed a first coating solution, the other to feed a second coating solution, with separate shims being provided for each manifold/slot layer). Each shim comprised openings of desired width and spacing to expel coating solution therethrough so as to form stripes of that coating solution of the desired width and pitch. The two shims were registered in relation to each other so as to deposit stripes in a generally alternating pattern as desired. In typical experiments, the total width of the coating area was approximately 2 inches.

Representative experiments were conducted with a first coating solution comprising PSA-O-1 (organic polymeric adhesive) and with a second coating solution comprising PSA-S-1 (silicone-based adhesive). The two coating solutions were fed to their respective slot layers at a feed rate of approximately 22 cc/min (in a few cases, the flowrate of the PSA-S-1 coating solution was kept at 22 cc/min and the flowrate of the PSA-O-1 coating solution was increased to 44 cc/min). Coating experiments were done at various line speeds, including 10, 20, 30, 40 and 50 feet per minute. After coating, the stripe-coated release liner was passed through a 3-zone forced air oven with zones operating respectively at approximately 57° C., 74° C. and 85° C. zone temperatures to yield a dry coating of the pressure-sensitive adhesive. After drying, the release liner, bearing the dried adhesive layer on the fluorosilicone release surface thereof, was rolled up and stored at ambient conditions until used.

Variations

Numerous variations of the above Representative Coating Process were done, including experiments with PSA-S-2 as the second coating solution. The method in which the coating solutions were delivered were also varied; e.g., apparatus was used in which flow passages were integrated as part of the die itself (in generally similar manner to the arrangements described previously herein), and in which the number and design of die shims were varied. It is believed that these variations in the particular manner in which the coating solutions were passed through the interior of the die did not significantly affect the behavior of the coating solutions once the solutions were coated on the release liner.

That is, they did not appear to significantly affect the herein-described preferential displacement of one coating solution by another.

Converting

A release liner bearing a primary adhesive layer thereon was typically stored in roll form until used. Then, the liner was unrolled (to expose the surface of the primary adhesive opposite the release liner) and the exposed surface of the primary adhesive layer was laminated to a foam backing. The layers were arranged so that the long axes of the adhesive stripes were oriented perpendicularly to the long axis of the foam backing unless otherwise noted. A secondary adhesive layer (bearing a secondary release liner) was then laminated to the opposite side of the foam backing. Often the secondary adhesive layer was a continuous coating of the organic polymeric adhesive of Comparative Example PSA-O-1 (described below).

The thus-formed double-faced adhesive article could then be stored until used.

Examples

Single-Adhesive Comparative Examples

Comparative Example PSA-O-1 comprised a continuous coating of PSA-O-1 (organic polymeric adhesive). To do this, the coating solution was expelled from the die-slot openings in discrete streams, but the flowrate of coating solution was such, and the release liner passed by the die in such manner, that the deposited stripes laterally merged with each other to form a continuous coated layer. Comparative Example PSA-O-1, when formed into a stretch-releasable tape and tested in the Elevated Humidity/Static Shear Test Method, exhibited a test result (time to failure) of approximately 2500 minutes.

Comparative Example PSA-S-2 comprised a continuous coating of PSA-S-2 (silicone-based adhesive in which the silicone elastomer was a silicone polyoxamide), coated in generally similar manner as Comparative Example PSA-O-1. Comparative Example PSA-S-2, when formed into a stretch-releasable tape and tested in the Elevated Humidity/Static Shear Test Method, exhibited a test result (time to failure) of >30000 minutes. Although not included herein as a specific Comparative Example, it is noted that continuous coatings of PSA-S-1 (silicone-based adhesive in which the silicone elastomer was a silicone polyurea) had similarly been found to meet the >30000 minute threshold in such testing.

Stripe-Coated Working Examples

In order to save space in the Tables, it is stipulated that all Working Examples in the following Tables exhibited a result of >30000 minutes when formed into a stretch-releasable tape and tested in an Elevated Humidity/Static Shear Test, excepting single-adhesive Comparative Examples C1 and C2 as discussed above. Also, in all of the following Examples the silicone-based adhesive was PSA-S-2 (in which the silicone elastomer was a silicone polyoxamide). To save space in the following Tables, the following abbreviations are used in the Tables:

Key

| Abbreviation | Units | Parameter |
|---|---|---|
| T-S | Mils | Thickness of silicone-based adhesive stripes |
| T-O | Mils | Thickness of organic polymeric adhesive stripes |
| P | Mm | Pitch, in mm |
| W-S (LS) | Mils | Width of silicone-based adhesive stripes (liner side) |
| W-S (OS) | Mils | Width of silicone-based adhesive stripes (opposite side) |
| W-O (LS) | Mils | Width of organic polymeric adhesive stripes (liner side) |
| W-O (OS) | Mils | Width of organic polymeric adhesive stripes (opp. side) |
| AF-S (LS) | % | Area fraction, silicone adhesive (liner side) |
| AF-S (OS) | % | Area fraction, silicone adhesive (opposite side) |
| VF-S | % | Volume fraction, silicone adhesive (for selected examples) |

The width (W) and thickness (T) of the various stripes were measured optically as described previously. The pitch (P, reported in mm) was indicative of the overall (average) center-to-center distance between adjacent stripes (and sub-stripes, if present). The stripe pitch was typically fairly uniform with the center-to-center distance between any two specific stripes closely approximating the overall average pitch. For clarity of presentation, in Tables 1 and 2 the widths of the various stripes in the silicone surface-enriched samples are omitted. Area fractions were calculated from the measured stripe widths as described above.

Table 1 shows parameters for stripes with surface-enrichment of the first, silicone-based adhesive being observed at the surface of the adhesive layer that was in contact with the release liner (i.e., stripes of the general arrangement of FIG. 1). These samples were all of the 20/40/20/40 generally alternating pattern. In Table 1, the opposite-side and liner-side area fractions are only listed for the first, silicone-based adhesive. The balance of the opposite-side and liner-side area fractions were occupied by the second, organic polymeric adhesive. Estimated volume fractions of the first, silicone-based adhesive are listed for selected samples.

TABLE 1

| No. | AF-S (OS) | AF-S (LS) | T-S | T-O | P | VF-S |
|---|---|---|---|---|---|---|
| 1-1 | 33 | 69 | 2.5 | 1.8 | 1.3 | ~42 |
| 1-2 | 46 | 89 | 1.6 | 1.4 | 1.3 | |
| 1-3 | 52 | 77 | 1.1 | 2.2 | 2.1 | |
| 1-4 | 55 | 90 | 2.4 | 1.7 | 1.3 | |
| 1-5 | 56 | 96 | 2.3 | 2.0 | 1.3 | ~61 |

In these data, comparison of the liner-side surface area fraction of silicone adhesive (AF-S (LS)) to the opposite-side fraction of silicone adhesive (AF-S (OS)) reveals the surface-enrichment of the liner-side surface of the adhesive layer that can be attained. For example, Working Example 1-1 had an opposite-side area fraction of silicone adhesive of approximately 33%, and yet the surface of the adhesive layer against the release liner was found to exhibit a silicone adhesive area fraction of approximately 69%, illustrating the ability of the silicone-based adhesive to preferentially displace the organic polymeric adhesive, at the surface of the adhesive layer that was in contact with the release liner.

To further illustrate the surface-enrichment phenomenon at the substrate surface, Table 1A presents the actual optically observed widths of the silicone-based adhesive stripes at the release liner surface (W-S (LS)) versus the optically observed widths of these stripes at the opposite surface (W-S (OS)). The widths for the organic polymeric adhesive stripes are also listed in Table 1A. (The surface area fractions of silicone-based adhesive listed in Table 1 were calculated from the width data of Table 1A.) With respect to the aforementioned $W_{lc}$ and $w_{le}$ parameters, it will be appreciated that the W-S (OS) parameter corresponds to $W_{lc}$ and that the W-S (LS) parameter corresponds to $W_{lc}+w_{le}+w_{le}$.

TABLE 1A

| No. | W-S (LS) | W-S (OS) | W-O (LS) | W-O (OS) |
|---|---|---|---|---|
| 1-1 | 73.9 | 35.0 | 32.7 | 71.5 |
| 1-2 | 90.0 | 46.6 | 10.6 | 54.1 |
| 1-3 | 133.2 | 89.5 | 40.6 | 84.3 |
| 1-4 | 94.5 | 57.3 | 10.6 | 47.8 |
| 1-5 | 101 | 58.5 | 4.1 | 46.5 |

Figure 2:
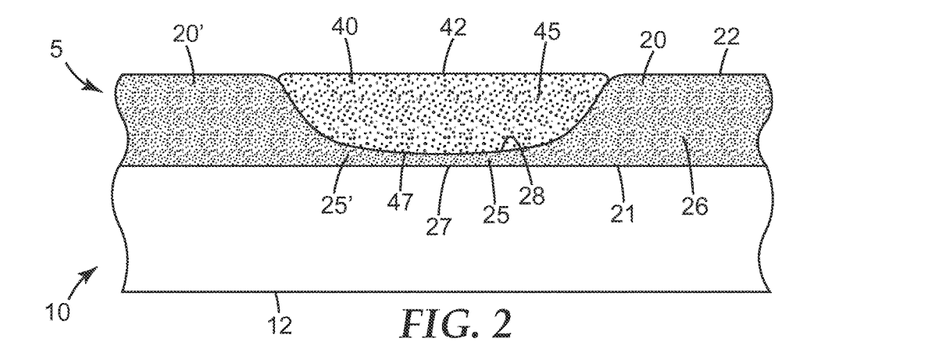
FIG. 2 is a schematic cross sectional slice view of a portion of another exemplary article as disclosed herein.

Table 2 shows parameters for stripes in which complete surface-enrichment of the first, silicone-based adhesive was observed at the surface of the adhesive layer that was in contact with the release liner (i.e., stripes of the general arrangement of FIG. 2). In Table 2, the opposite-side and liner-side area fractions are only listed for the first, silicone-based adhesive. For these samples, the balance of the opposite-side and liner-side area fractions were occupied by the second, organic polymeric adhesive.

TABLE 2

| No. | AF-S (OS) | AF-S (LS) | T-S | T-O | P | VF-S |
|---|---|---|---|---|---|---|
| 2-1 | 48 | 100 | 2.1 | 2.0 | 1.3 | |
| 2-2 | 51 | 100 | 3.1 | 2.3 | 1.3 | |
| 2-3 | 53 | 100 | 1.7 | 1.5 | 1.6 | |
| 2-4 | 57 | 100 | 2.4 | 1.7 | 2.5 | ~69 |
| 2-5 | 58 | 100 | 2.6 | 1.9 | 1.5 | |
| 2-6 | 61 | 100 | 3.0 | 1.3 | 2.1 | ~82 |

In these data, comparison of the liner-side surface area fraction of silicone adhesive (AF-S (LS)) to the opposite-side fraction of silicone adhesive (AF-S (OS)) reveals the high degree of surface enrichment of the liner-side surface that can be achieved if desired. For example, Working Example 2-1 had an opposite-side area fraction of silicone of approximately 48%, and yet the surface of the adhesive layer against the release liner was found to exhibit a silicone adhesive area fraction of approximately 100%, indicating that the silicone adhesive had completely preferentially displaced the organic polymeric adhesive at the surface of the adhesive layer that was in contact with the release liner. It was sometimes found that some enrichment of the first (silicone-based) adhesive also occurred on the surface of the adhesive layer opposite the release liner (that is, the surface that was exposed to air after deposition of the coating solution on the release liner). Such samples often exhibited an appearance generally similar to that shown in FIG. 3. Typically, the extent of the surface-enrichment on this surface was not as great as that on the release liner surface.

The foregoing Examples have been provided for clarity of understanding only. No unnecessary limitations are to be understood therefrom. The tests and test results described in the Examples are intended solely to be illustrative, rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary structures, features, details, configurations, etc., that are disclosed herein can be modified and/or combined in numerous embodiments. (In particular, all elements that are positively recited in this specification as alternatives, may be explicitly included in the claims or excluded from the claims, in any combination as desired.) All such variations and combinations are contemplated by the inventor as being within the bounds of the conceived invention not merely those representative designs that were chosen to serve as exemplary illustrations. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. An article comprising: a substrate comprising a first major surface;
   a primary adhesive layer disposed on the first major surface of the substrate,
   wherein the primary adhesive layer comprises a plurality of stripes of a first pressure-sensitive adhesive and of a second pressure-sensitive adhesive, arranged in a generally alternating pattern across a lateral extent of the substrate;
   wherein for at least for selected stripes of the first pressure-sensitive adhesive, a lateral edge portion of the first pressure-sensitive adhesive stripe inwardly underlies, and is in contact with, a lateral edge portion of a second pressure-sensitive adhesive stripe that is laterally adjacent to the first pressure-sensitive adhesive stripe, and, an interface between a lateral edge of the first pressure-sensitive adhesive stripe and a lateral edge of the second pressure-sensitive adhesive stripe that is laterally adjacent to the first pressure-sensitive adhesive stripe, is at a non-perpendicular angle to a major plane of the substrate, and
   a substrate-side lateral width of the first pressure-sensitive adhesive stripe is greater than an opposite-side lateral width of the first pressure-sensitive adhesive stripe by a factor of at least about 1.2,
   and wherein the first pressure-sensitive adhesive provides an overall area fraction, on a side of the primary adhesive layer that faces the first major surface of the substrate, of less than 100%.

2. The article of claim 1, wherein the first pressure-sensitive adhesive stripe comprises a laterally-central portion with a second major surface that faces generally opposite a first major surface of the first pressure-sensitive adhesive stripe, which second major surface of the laterally-central portion of the first pressure-sensitive adhesive stripe is not in contact with or covered by the second pressure-sensitive adhesive stripe.

3. The article of claim 2 wherein at least a part of the lateral edge portion of the first pressure-sensitive adhesive stripe comprises a thickness that is less than about 20% of an average thickness of the laterally-central portion of the first pressure-sensitive adhesive stripe.

4. The article of claim 2 wherein the lateral edge portion of the first pressure-sensitive adhesive stripe comprises an average lateral width that is at least 20% of an average lateral width of the laterally-central portion of the first pressure-sensitive adhesive strip.

5. The article of claim 1, wherein the first pressure-sensitive adhesive provides a substrate-side area fraction on the substrate-facing surface of the primary adhesive layer and provides an opposite-side area fraction on the side of the primary adhesive layer that is opposite the substrate, and wherein the primary adhesive layer exhibits a first pressure-sensitive adhesive surface-enrichment factor that is the ratio of the substrate-side area fraction of the first pressure-sensitive adhesive to the opposite-side area fraction of the first pressure-sensitive adhesive, and wherein the first pressure-sensitive adhesive surface-enrichment ratio is at least about 1.2.

6. The article of claim 5, wherein the first pressure-sensitive adhesive surface-enrichment ratio is at least about 1.6.

7. The article of claim 1, wherein the first pressure-sensitive adhesive provides a volume fraction of the primary adhesive layer that is from about 30% to about 90%.

8. The article of claim 1, wherein the first pressure-sensitive adhesive provides a volume fraction of the primary adhesive layer that is from about 40% to about 80%.

9. The article of claim 1, wherein the first pressure-sensitive adhesive provides an overall area fraction, on a side of the primary adhesive layer that is opposite the substrate, of from greater than about 20%, to about 70%.

10. The article of claim 1, wherein the first pressure-sensitive adhesive provides an overall area fraction, on a side of the primary adhesive layer that is opposite the first substrate, of from greater than about 30%, to about 60%.

11. The article of claim 1, wherein the first pressure-sensitive adhesive is a silicone-based pressure-sensitive adhesive.

12. The article of claim 11, wherein the second pressure-sensitive adhesive is an organic polymeric pressure-sensitive adhesive.

13. The article of claim 12, wherein the organic polymer pressure sensitive adhesive comprises and organic elastomer selected from the group consisting of styrenic block copolymer elastomers, natural rubber elastomers, (meth)acrylate elastomers, and mixtures and blends thereof.

14. The article of claim 1, wherein the substrate is a release liner comprising a fluorosilicone release surface.

15. The article of claim 14 wherein the first pressure-sensitive adhesive is a silicone-based pressure-sensitive adhesive and the second pressure-sensitive adhesive is an organic polymeric pressure-sensitive adhesive.

16. The article of claim 1 wherein the substrate is a release liner and wherein a side of the primary adhesive layer that is opposite the substrate is bonded to a secondary substrate that is a highly extensible substrate so that the primary adhesive layer and the highly extendable secondary substrate form a stretch-releasable article.

* * * * *

UNITED STATES PATENT AND TRADEMARK OFFICE
CERTIFICATE OF CORRECTION

PATENT NO. : 9,765,240 B2
APPLICATION NO. : 14/901341
DATED : September 19, 2017
INVENTOR(S) : Tyler Rattray Page 1 of 1

It is certified that error appears in the above-identified patent and that said Letters Patent is hereby corrected as shown below:

In the Specification

Column 9
Line 13, Delete "61/838,504," and insert -- 61/838,504, Attorney Docket No. 71412US002, --, therefor.

Column 16
Line 40, Delete "moities" and insert -- moieties --, therefor.

Column 16
Line 44, Delete "moities" and insert -- moieties --, therefor.

Column 21
Line 28 (Approx.), Delete "61/838,504," and insert -- 61/838,504, Attorney Docket No. 71412US002, --, therefor.

In the Claims

Column 28
Lines 7-8, In Claim 12 Delete "polymer pressure sensitive adhesive comprises and organic elastomer" and insert -- polymeric pressure sensitive adhesive comprises an organic elastomer, --, therefor.

Signed and Sealed this
Eighth Day of May, 2018

Andrei Iancu
*Director of the United States Patent and Trademark Office*